(12) United States Patent
Kobashi

(10) Patent No.: US 8,555,012 B2
(45) Date of Patent: Oct. 8, 2013

(54) DATA STORAGE APPARATUS

(71) Applicant: Fujitsu Limited, Kawasaki (JP)

(72) Inventor: Kyuu Kobashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/689,002

(22) Filed: Nov. 29, 2012

(65) Prior Publication Data

US 2013/0086346 A1    Apr. 4, 2013

Related U.S. Application Data

(62) Division of application No. 12/417,080, filed on Apr. 2, 2009, now abandoned.

(30) Foreign Application Priority Data

Apr. 3, 2008  (JP) .................................. 2008-097006

(51) Int. Cl.
    *G06F 12/16*    (2006.01)
(52) U.S. Cl.
    USPC .................... 711/162; 711/161; 711/E12.001
(58) Field of Classification Search
    USPC ................................... 711/162, 161, E12.001
    See application file for complete search history.

(56) References Cited

U.S. PATENT DOCUMENTS

| | | |
|---|---|---|
| 2006/0085663 A1 | 4/2006 | Sutoh |
| 2006/0236049 A1 | 10/2006 | Iwamura |
| 2007/0050576 A1 | 3/2007 | Suzuki |

FOREIGN PATENT DOCUMENTS

| | | |
|---|---|---|
| JP | 2001-331378 | 11/2001 |
| JP | 2002-373093 | 12/2002 |
| JP | 2005-085145 | 3/2005 |
| JP | 2006-293850 | 10/2006 |
| JP | 2007-65873 | 3/2007 |
| JP | 2007-249652 | 9/2007 |

OTHER PUBLICATIONS

U.S. Office Action mailed Aug. 17, 2011 in U.S. Appl. No. 12/417,080.
U.S. Restriction Requirement mailed Feb. 24, 2012 in U.S. Appl. No. 12/417,080.
U.S. Final Office Action mailed Jul. 12, 2012 in U.S. Appl. No. 12/417,080.
Japanese Notification of Reasons for Refusal mailed May 22, 2012 corresponds to Japanese Patent Application No. 2008-097006.
U.S. Appl. No. 12/417,080, filed Apr. 2, 2009, Kyuu Kobashi, Fujitsu Limited.

*Primary Examiner* — Yong Choe
(74) *Attorney, Agent, or Firm* — Staas & Halsey LLP

(57) ABSTRACT

A method for controlling a storage apparatus connectable to a server, the storage apparatus including a first storage area and a second storage area for storing data, the method comprises: copying the data stored in the first storage area into the second storage area; copying data stored in the location of the first storage area addressed by the command to be accessed by the server into the location of the second storage area before execution of the command when the storage apparatus receives a command for accessing data stored in a location of either of the first storage area and second storage area from the server; and executing the command for accessing at least one of the location in the first storage area and the corresponding location in the second storage area.

3 Claims, 15 Drawing Sheets

DATA STORAGE APPARATUS

CROSS-REFERENCE TO RELATED APPLICATION

This application is a divisional of U.S. patent application Ser. No. 12/417,080 filed on Apr. 2, 2009 which is based upon and claims the benefit of priority of prior Japanese Patent Application No. 2008-097006, filed on Apr. 3, 2008 the entire contents of which are incorporated herein by reference.

FIELD

The embodiments discussed herein below is related to a data storage apparatus.

BACKGROUND

There is a storage system in which a server and a storage apparatus are coupled via a network. In the storage system, identical data is stored in each of multiple data storage areas of the storage apparatus so as to prevent loss of data or distribute the load. To write identical data into each of multiple data storage areas is called "mirroring."

The mirroring relation between the multiple data storage areas is sometimes broken. If the mirroring relation is broken and then a mirroring relation is reestablished, data stored in one data storage area is copied to the other data storage area. Related-art examples include Japanese Laid-open Patent Publication No. 2002-373093 and Japanese Laid-open Patent Publication No. 2007-249652.

Pieces of data stored in the data storage areas are different from one another until a copy process is completed. Therefore, the server cannot access data stored in a copy-destination data storage area until the copy process is completed.

SUMMARY

According to an aspect of the invention, a method for controlling a storage apparatus connectable to a server, the storage apparatus including a first storage area and a second storage area for storing data, the method comprises: copying the data stored in the first storage area into the second storage area; copying data stored in the location of the first storage area addressed by the command to be accessed by the server into the location of the second storage area before execution of the command when the storage apparatus receives a command for accessing data stored in a location of either of the first storage area and second storage area from the server; and executing the command for accessing at least one of the location in the first storage area and the corresponding location in the second storage area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment of the present invention will be described with reference to the accompanying drawings.

Storage System

Figure 1:
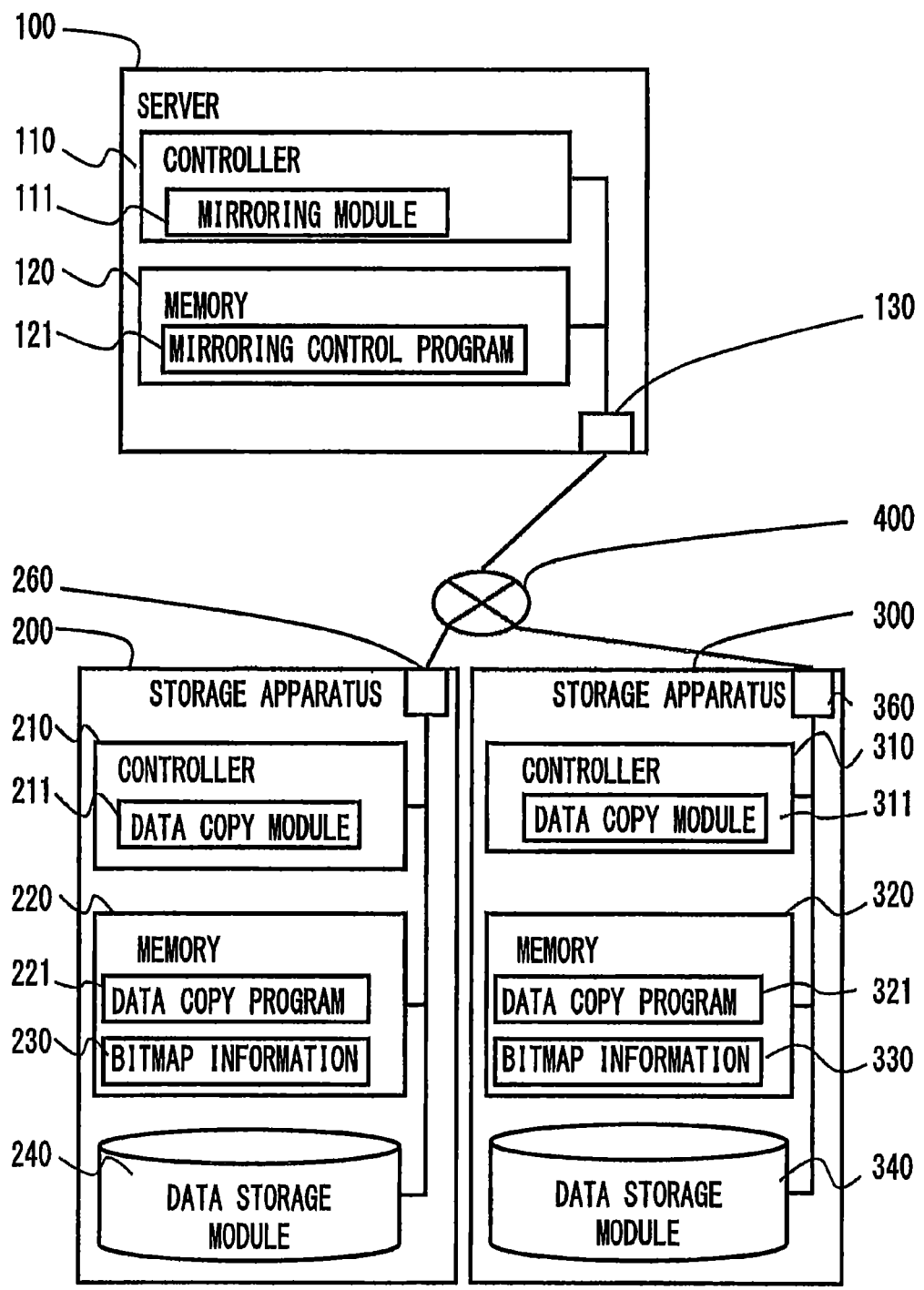
FIG. 1 is a diagram illustrating a storage system 1 according to an embodiment of the present invention.

FIG. 1 is a storage system according to this embodiment. The storage system includes a server 100, a storage apparatus 200 (first storage apparatus), and a storage apparatus 300 (second storage apparatus). The server 100, storage 200, and storage 300 are coupled via a network 400. The network 400 is, for example, a fibre channel.

Mirroring

In the storage system according to this embodiment, it is assumed that a data storage area of the storage 200 and that of the storage 300 have a mirroring relation. Mirroring is a data storage form in which identical data is stored in each of multiple data storage areas. The server 100 stores identical data in each of the storage apparatuses 200 and 300, between which mirroring is performed. Therefore, even if a failure occurs in any one of the storage apparatuses, loss of the data is avoided. Note that mirroring according to this embodiment is mirroring between the logical volumes of the storage apparatuses. A logical volume is an area made up of multiple physical disk apparatuses. There is also a logical volume having redundancy.

In the following description, a "mirroring process" refers to a state in which identical data is stored in each of corresponding data storage areas of the storage apparatuses. When data is read in a mirroring process, the data is read from one data storage area. When data is written in a mirroring process, the identical data is written into all data storage areas. Here, it is assumed that the data storage areas having a mirroring relation are associated with each other.

Also, a "mirror process" refers to a process for updating data stored in a data storage area so as to perform a mirroring process. A mirror process is performed when different pieces of data are stored in the data storage areas, which are subjects of mirroring. A mirror process includes a process for storing information related to different pieces of data stored in the data storage areas and a process for matching the different pieces of data stored in the data storage areas with each other.

The server performs a mirroring process on both the storage apparatuses. If the server can write data into only any one of the storage apparatuses, the storage apparatus into which the data has been written retains information about an area thereof into which the data has been written. When the server can access both the storage apparatuses again, the storage apparatuses perform a mirror process.

Server 100

The server 100 includes a controller 110, a memory 120, and an interface 130. The memory 120 of the server 100 stores a mirroring control program 121. The interface 130 of the server 100 is a terminal for accessing the storage apparatuses 200 and 300 via the network 400. The controller 110 of the server 100 functions as a mirroring module 111 by executing the mirroring control program 121 stored in the memory 120.

The mirroring module 111 performs a mirror process between data stored in the storage apparatus 200 and data stored in the storage apparatus 300 and a mirroring process between the data stored in the storage apparatus 200 and the data stored in the storage apparatus 300 in conjunction with the storage apparatuses 200 and 300. Specifically, the mirroring module 111 performs the following process.

If the storage apparatus 200 and storage apparatus 300 have a mirroring relation, the mirroring module 111 of the server 100 performs a mirroring process. Specifically, the mirroring module 111 performs a data write access and a data read access to the storage apparatuses 200 and 300 as follows. If the mirroring module 111 writes data into the respective data storage areas of the storage apparatuses 200 and 300, it transmits a data write command to each of the storage apparatuses 200 and 300. If the mirroring module 111 reads data from the storage apparatus 200 or 300, it transmits a data read command to the storage apparatus 200 or 300.

If the mirroring module 111 detects a data storage area that can no longer maintain mirroring, it transmits information indicating that the data storage area will be separated from the mirroring relation, to the storage apparatuses 200 and 300. If the server 100 establishes a mirroring relation between the data storage area of the storage apparatus 200 and that of the storage apparatus 300, it causes the storage apparatuses 200 and 300 to perform a mirror process. In the mirror process, the mirroring module 111 transmits information indicating that the data storage area that has been separated from the mirroring relation will return to a mirroring relation, to the storage apparatuses 200 and 300. If data stored in the data storage area of the storage apparatus 200 and data stored in that of the storage apparatus 300 are different from each other, the mirroring module 111 causes the storage apparatuses 200 and 300 to perform a mirror process.

The data stored in the data storage area of the storage apparatus 200 and the data stored in that of the storage apparatus 300 are different from each other at the following times: (1) when a mirroring relation is established between the data storage area of the storage apparatus 200 and that of the storage apparatus 300 for the first time; and (2) when a mirroring relation is reestablished between the data storage area of the storage apparatus 200 and that of the storage apparatus 300 after the mirroring relation therebetween is temporarily broken.

Storage Apparatuses

Next, the storage apparatuses 200 and 300 will be described. The storage apparatus 200 includes a controller 210, a memory 220, a data storage module 240, and an interface 260. The storage apparatus 300 has the same configuration as that of the storage apparatus 200 and includes a controller 310, a memory 320, a data storage module 340, and an interface 360. The controller 210, memory 220, data storage module 240, and interface 260 of the storage apparatus 200 have the same functions as those of the controller 310, memory 320, data storage module 340, and interface 360, respectively, of the storage apparatus 300. For this reason, only the controller 210, memory 220, data storage module 240, and interface 260 of the storage apparatus 200 will be described and the storage apparatus 300 will not be described. The storage apparatus can allow the server to access multiple data storage areas even when a process for establishing a mirroring relation between the data storage areas is being performed. The storage apparatus can allow the server to access the data storage areas without having to wait for the completion of a process for establishing mirroring relations between all areas of the first data storage area and corresponding areas of the second data storage area.

The storage apparatus 200 and 300 connects to the server 100. The storage apparatus 200 and 300 have data storage module 240 (first or second storage area) and 340 (first or second storage area) for storing data. The controller 210 or 310 executes a process including: copying the data stored in the first storage area into the second storage area; copying data stored in the location of the first storage area addressed by the command to be accessed by the server into the location of the second storage area before execution of the command when the storage apparatus receives a command for accessing data stored in a location of either of the first storage area and second storage area from the server; and executing the command for accessing at least one of the location in the first storage area and the corresponding location in the second storage area.

The command includes accessing data stored in a location that the copying process is unexecuted. The controller 210 or 310 executes copying data stored in the location of the first storage area addressed by the command before the initiation of the execution of the command.

The area to be subjected to the copying is divided into predetermined areas. Bitmap information recording whether each of the predetermined areas has undergone the copying is controlled by the storage apparatus 200 or 300. The command is made to an area that has undergone the copying is determined on the basis of the bitmap information.

The interface 260 is a terminal for accessing the server 100 and storage apparatus 300 via the network 400. The memory 220 stores a data copy program 221 to be executed by the controller 210, information indicating a halfway result of a data copy process, bitmap information 230, and the like. The memory 220 is, for example, a random access memory (RAM), a read-only memory (ROM), or the like.

The controller 210 functions as a data copy module 211 by executing the data copy program 221 stored in the memory 220. The data copy module 211 performs a mirror process between the storage apparatus 200 and storage apparatus 300.

The data storage module 240 stores data to be accessed by the server 100. As for the storage apparatus 200, a volume 250 is set in the data storage module 240. The volume 250 is a unified data storage area that can be recognized by the server 100. The storage apparatus 200 or 300 receive a command (an access) from the host 100. The command (access) includes information indicating the location of data to be accessed, information for identifying whether a command is a read command or a write command, and information about data to be written. Hereafter, an access for writing data into a target block area will be referred to as a "write access" and an access for reading data from a target block area will be referred to as a "read access."

Relations between Bits of Bitmap Information and Block Areas of Volume

Figure 2:
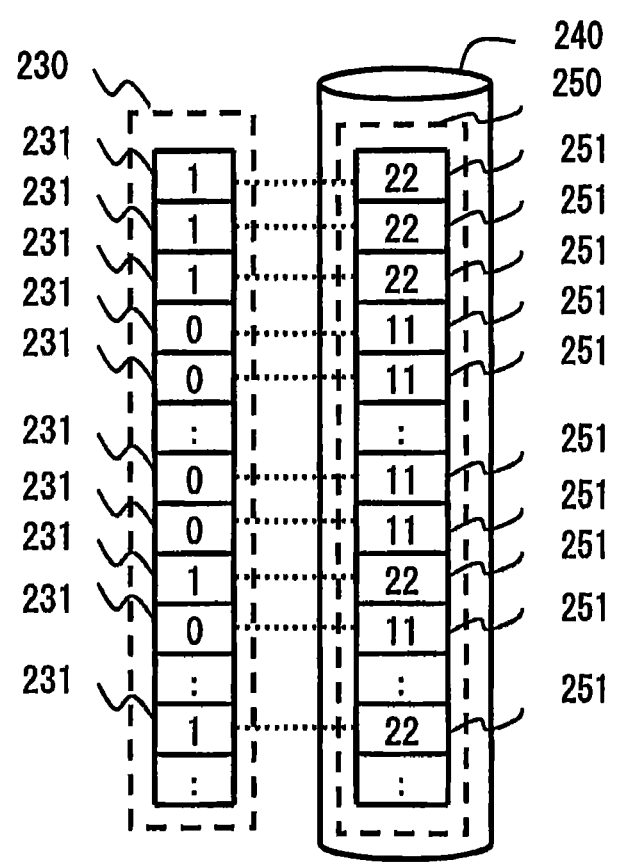
FIG. 2 is a diagram illustrating the relations between bits 231 of bitmap information 230 and block areas 251 of a volume 250.

Hereafter, the relations between bits 231 of the bitmap information 230 and block areas 251 of the volume 250 will be described. FIG. 2 is a diagram illustrating the relations between the bits 231 of the bitmap information 230 and the block areas 251 of the volume 250. The volume 250 according to this embodiment includes multiple block areas 251. The block areas 251 are data storage areas obtained by partitioning the volume 250 into predetermined unit sizes. In this embodiment, it is assumed that data stored in each block area is "11," "22," or "33." Data "11" is data where data stored in a block area 251 of the volume 250 and data stored in a corresponding block area of the volume 350 are matched before an abnormality occurs in the storage apparatus. Data "22" is data that has been updated by writing another data into the storage apparatus after the storage apparatus is separated from the mirroring relation. Data "33" is data that will be updated during a mirror process.

Data "11" or data "22" is stored in each block area illustrated in FIG. 2. Data "11" is data where data stored in a block area 251 of the volume 250 and data stored in a corresponding block area of the volume 350 have a mirroring relation. Data "22" is data where data stored in a block area 251 of the volume 250 and data stored in a corresponding block area of the volume 350 do not have a mirroring relation.

In the bitmap information 230 according to this embodiment, the state of mirroring between the volume 250 and volume 350 is recorded. That is, the bitmap information 230 is information (difference information) indicating that block areas of the volume 250 and corresponding block areas of the volume 350 are storing different pieces of data in a state in which the mirroring relation between the volume 250 and volume 350 is broken. Also, during performance of a mirror process, the bitmap information 230 indicates the progress of the mirror process.

The bitmap information 230 includes multiple bits 231. The bits 231 are assigned to the block areas 251 of the volume 250. Each bit 231 retains a value "1" or a value "0." The value "1" indicates that data included in a block area 251 corresponding to a bit 231 is different from data included in a block area 351 of the volume 350 that has a mirroring relation with the block area 251.

The value "0" indicates that data included in a block area 251 corresponding to a bit 231 is identical to data included in a block area 351 of the volume 350 that has a mirroring relation with the block area 251. If the storage apparatus 200 updates data included in a block area 251, it also updates the value of a bit 231 corresponding to the block area 251. When the storage apparatus 200 is separated from the mirroring relation as described later, it updates each bit 231 from "0" to "1." Also, when a mirroring relation is reestablished as described later, the storage apparatus 200 updates the bit 231 from "1" to "0."

The volumes 250 and 350, which have broken the mirroring relation, are classified into two types of volumes. One type of volume is a volume that receives an access for updating data from the server after the mirroring relation has been broken. In this embodiment, it is assumed that the volume 250 receives an access for updating data from the server 100 after the mirroring relation has been broken. Another type of volume is a volume that does not receive an access for updating data in the volume from the server 100 after the mirroring relation has been broken. In this embodiment, it is assumed that the volume 350 does not receive an access for updating data from the server 100 after the mirroring relation has been broken.

The volume 250 that receives an access for updating data will serve as the copy-source volume in a mirror process. The volume 350 that does not receive an access for updating data will serve as the copy-destination volume in a mirror process.

If the storage apparatus 200 receives, from the server 100, information indicating that the volume 350 of the storage apparatus 300 has been separated from the mirroring relation, it creates the bitmap information 230 in the memory 220. The storage apparatus 200 records an update of data stored in a block area 251 of the volume 250 by updating the value of a bit 231 of the bitmap information 230 corresponding to the block area 251. The storage apparatus 200 retains the update of the data in the bitmap information 230 until the storage apparatus 200 receives an instruction for reestablishing a mirroring relation from the server 100 after the creation of the bitmap information 230. The initial value of each bit 231 of the bitmap information 230 created by the storage apparatus 200 is "0." Upon receipt of a write access from the server 100, the storage apparatus 200 updates data stored in a block area 251 corresponding to the write access. Subsequently, the storage apparatus 200 changes the value of a bit corresponding to the block area 251 whose data has been updated, to "1."

During performance of a mirror process, the bitmap information 230 indicates the progress of the mirror process. Specifically, when the values of all bits of the bitmap information 230 are "0," the volume 250 and volume 350 have a relation where a mirroring process can be performed. That is, the relation where a mirroring process can be performed is a state where the volume 250 and volume 350 are mirrored (a state where a mirror process is unnecessary). On the other hand, if the value of a bit 231 of the bitmap information 230 is "1," the storage apparatus 200 copies data stored in a block area 251 corresponding to the bit 231, to a corresponding block area 351 of the volume 350 of the storage apparatus 300. Upon completion of the copy of the data stored in the block area 251, the storage apparatus 200 updates the value of the bit 231 corresponding to the block area 251 from "1" to "0."

Use of the bitmap information 230 allows transmitting only updated data in a mirror process performed by the storage apparatuses 200 and 300. Specifically, when a mirror process is performed between the storage apparatuses 200 and 300, data is sometimes copied via the network 400. In this case, the storage apparatus 200 transmits only pieces of data stored in block areas 252 of the volume 250 that each reestablish a mirroring relation, on the basis of the bitmap information 230. As a result, the storage apparatus 200 can make the amount of data to be transmitted to the storage apparatus 300 smaller than that of data stored in all the block areas 251 of the volume 250.

Next, operations of the storage system according to this embodiment will be described. In the storage system, the storage apparatus 200 and storage apparatus 300 can be placed in a state in which a mirroring process can be performed and a state in which a mirroring process cannot be performed. Here, it is assumed that the volume 250 of the storage apparatus 200 and the volume 350 of the storage apparatus 300 in the storage system are normally mirrored. In this case, if the server 100 detects an abnormality when making an access to the storage apparatus 300, it separates the storage apparatus 300 from the mirroring relation. For example, if the server 100 transmits a write command or a read command to the storage apparatus 200 or 300 and then receives no response from the storage apparatus even after the lapse of a predetermined time, it determines that an abnormality has occurred with respect to the access. The reason why the server 100 receives no response even after the lapse of a predetermined time is, for example, that the processing speed of the storage apparatus has decreased or that any failure has occurred in the route of the network 400 between the server 100 and the storage apparatus.

A state in which the storage apparatus 300 is separated from the mirroring relation is a state in which a mirroring process cannot be performed. Subsequently, the server 100 makes a write access to the storage apparatus 200. In response, the storage apparatus 200 records, in the bitmap information, a location where data has been updated so as to perform a mirror process after the storage apparatus 300 is restored from the abnormality.

Subsequently, the storage apparatus 300 is recovered from the abnormality due to a reduction in the load imposed on the network, recovery of the network route from a failure, recovery of the storage apparatus from a failure, or the like. Subsequently, the storage apparatus 200 performs a process for reestablishing a mirroring relation between the storage apparatuses 200 and 300. Hereafter, the operation sequences of the server 100, storage apparatus 200, and storage apparatus 300 will be described.

In Normal Times

Figure 3:
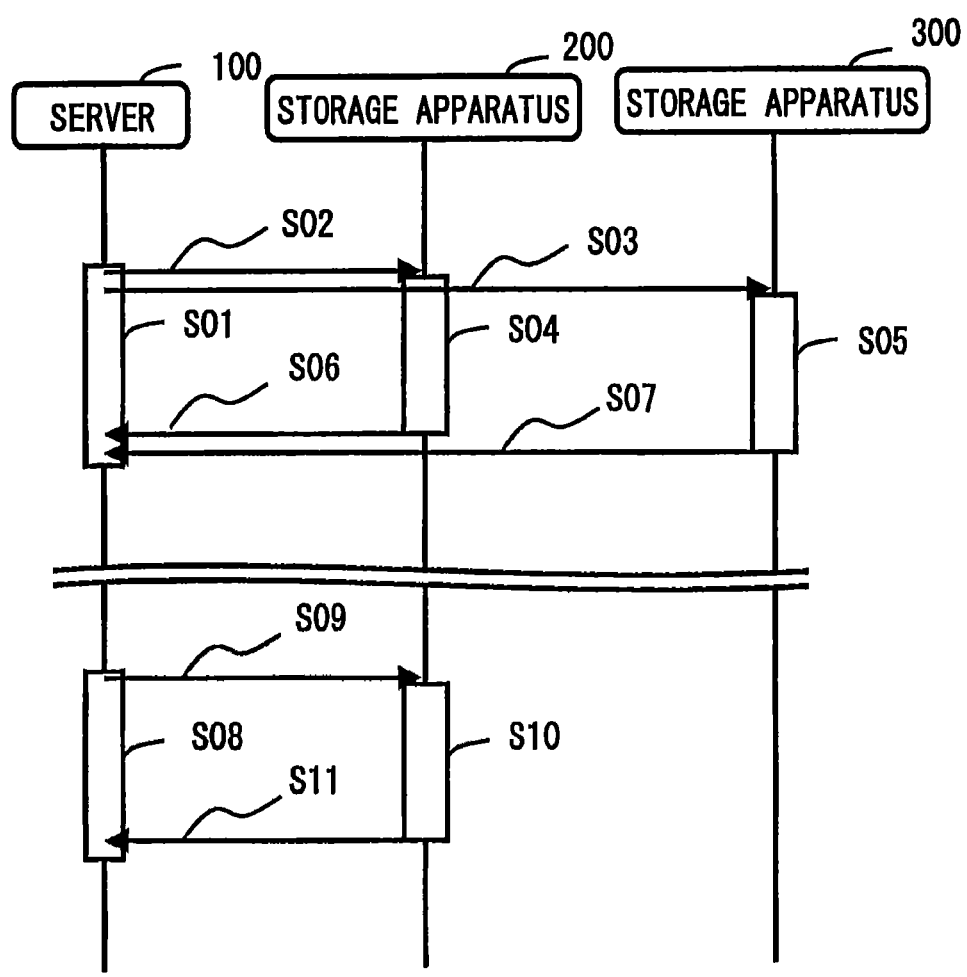
FIG. 3 is a diagram illustrating an operation sequence of mirroring normally performed in the storage system.

FIG. 3 is a diagram illustrating an operation sequence of mirroring normally performed in the storage system. The server 100 normally issues a write command to each of the storage apparatus 200 and storage apparatus 300. Therefore, the server 100 normally performs mirroring between the storage apparatus 200 and storage apparatus 300.

S01 to S07 illustrated in FIG. 3 are a sequence of operations performed when the server 100 normally makes a data write access to each of the storage apparatus 200 and storage apparatus 300. The server 100 starts performing a data write process on each of the storage apparatuses 200 and 300 (S01). The server 100 transmits a data write command to each of the storage apparatuses 200 and 300 (S02, S03). The storage apparatuses 200 and 300 each perform a process corresponding to the received data write command (S04, S05). Upon completion of the process, the storage apparatus 200 transmits information indicating the completion to the server 100 (S06). Likewise, upon completion of the process, the storage apparatus 300 transmits information indicating the completion to the server 100 (S07). Upon receipt of these pieces of completion information, the server 100 completes the write process.

S08 to S11 illustrated in FIG. 3 are a sequence of operations performed when the server 100 normally makes a data read access to the storage apparatus 200. The server 100 starts performing a process for reading data from the storage apparatus 200 (S08). The server 100 transmits a data read command to the storage apparatus 200 (S09). The storage apparatus 200 performs a process corresponding to the received data read command (S10). The storage apparatus 200 reads data in accordance with the received data read command and transmits the read data to the server 100 (S11). Upon receipt of the data, the server 100 completes the read process. A process related to a data read access that the server 100 makes to the storage apparatus 300 is the same as the process related to the data read access that the server 100 makes to the storage apparatus 200 and will not be described.

Figure 4:
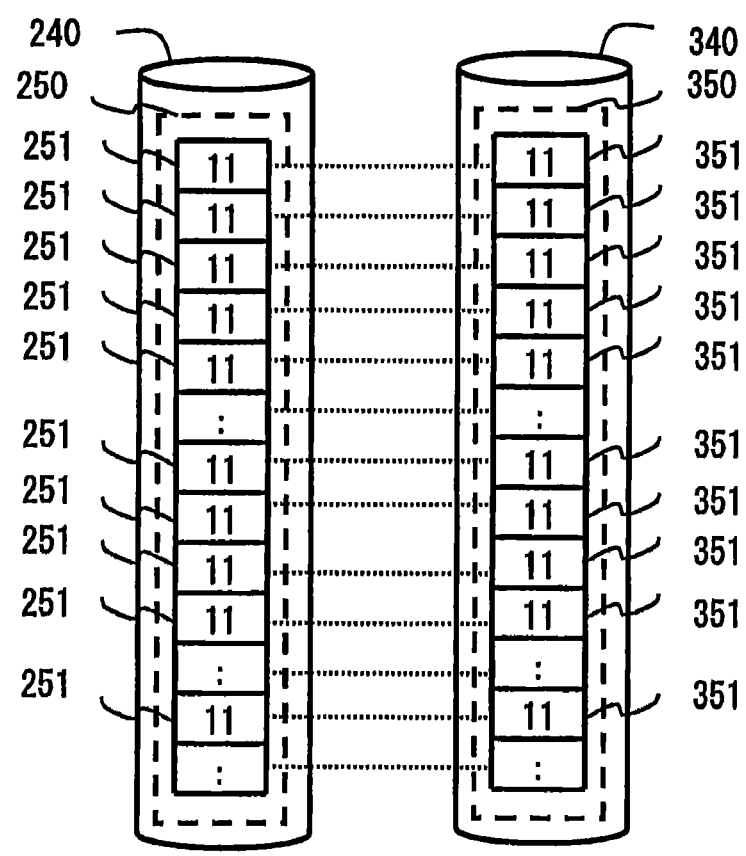
FIG. 4 is a diagram illustrating the relations between pieces of data stored in the volume 250 and pieces of data stored in a volume 350 at the time when storage apparatuses have a mirroring relation.

FIG. 4 is a diagram illustrating the relations between pieces of data stored in the volume 250 and pieces of data stored in the volume 350 when the storage apparatuses have a mirroring relation. Data stored in each of the block areas 251 of the volume 250 is "11" and data stored in each of the block areas 351 of the volume 350 is "11."

Separation of Storage Apparatus from Mirroring Relation

Next, a sequence of operations performed when an abnormality has occurred with respect to a write access or a read access that the server 100 makes to the storage apparatus 300 in a normal mirroring state will be described. If the server 100 transmits a write access or a read access to the storage apparatus 200 or 300 and then receives no response from the storage apparatus even after the lapse of a predetermined time, it determines that an abnormality has occurred with respect to the access. The reason why the server 100 receives no response with respect to the access even after the lapse of a predetermined time is, for example, that the processing speed of the storage apparatus has reduced or that a failure has occurred in the route of the network 400 between the server 100 and the storage apparatus.

Figure 5:
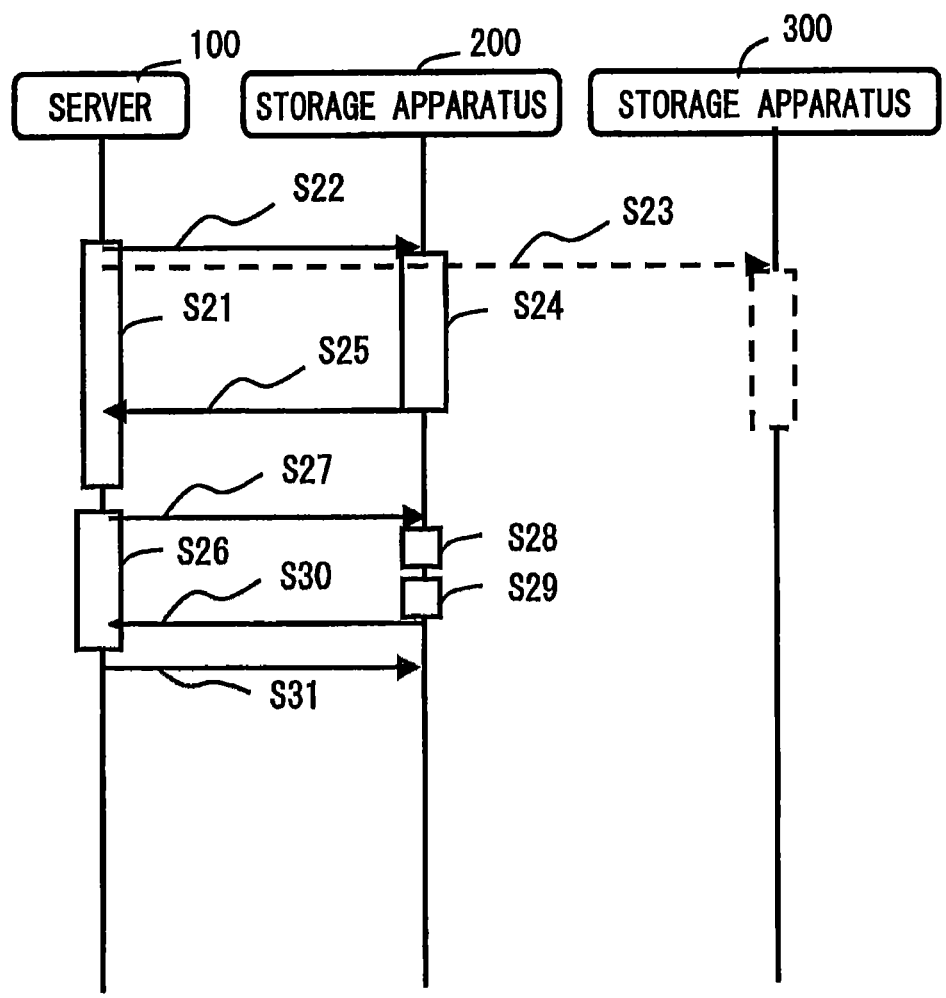
FIG. 5 is a diagram illustrating an operation sequence of mirroring performed in the storage system in the event of a failure.

A sequence of operations performed when the server 100 receives no response with respect to an access that the server 100 has made to the storage apparatus 300 will be described. FIG. 5 is a diagram illustrating an operation sequence of mirroring performed in the storage system in the event of a failure. The server 100 starts a process for writing data into the storage apparatuses (S21). The server 100 transmits a data write command to each of the storage apparatus 200 and storage apparatus 300 (S22, S23). The storage apparatus 200 performs a process corresponding to the received data write command (S24). Upon completion of the process, the storage apparatus 200 transmits information indicating the completion to the server 100 (S25). On the other hand, the server 100 does not obtain completion information even after a predetermined time has elapsed after transmitting the data write command. The reason is, for example, that a failure has occurred on the network 400 between the server 100 and storage apparatus 300, that a delay has occurred when the storage apparatus 300 is performing a process, or the like.

The server 100 determines that it cannot access the storage apparatus 300 (S26) and separates the storage apparatus 300 from the mirroring relation.

The server 100 transmits an instruction for starting a process for storing a data difference, to the storage apparatus 200 (S27). The storage apparatus 200 starts a data storage process in accordance with the instruction received from the server 100 (S28). The storage apparatus 200 creates the bitmap information 230 (S29). The storage apparatus 200 sets a value indicating that data included in a block area of the volume 250 corresponding to a bit 231 is identical to data included in a corresponding block area of the volume 350, as the initial value of each bit 231 of the bitmap information 230. The storage apparatus 200 transmits information indicating that it has created the bitmap information 230, to the server 100 (S30).

Figure 6:
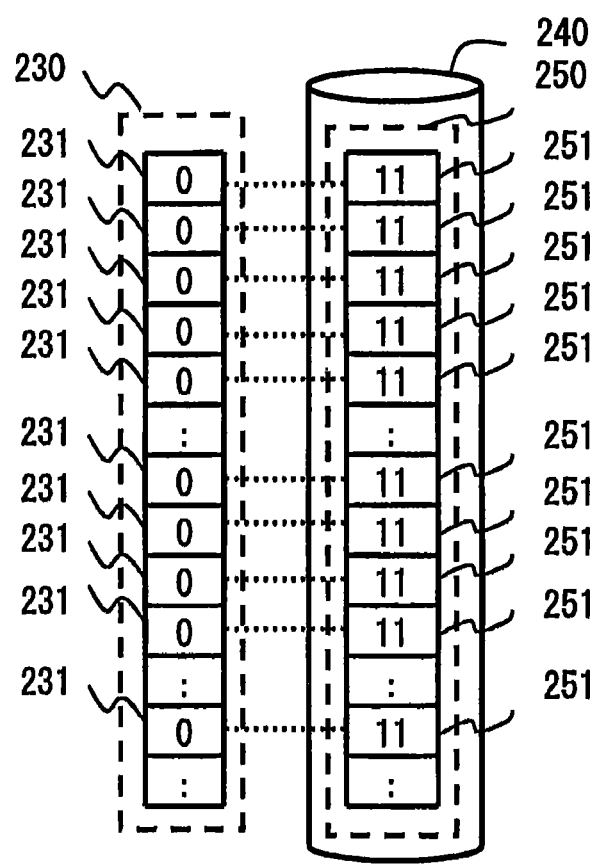
FIG. 6 is a diagram illustrating the relations between the block areas 251 of the volume 250 and the bits 231 of the bitmap information 230 at the time when the bitmap information 230 has been created.

FIG. 6 is a diagram illustrating the relations between the block areas 251 of the volume 250 and the bits 231 of the bitmap information 230 at the time when the bitmap information 230 has been created. The reference numerals are the same as those illustrated in FIG. 2 and will not be described. Here, it is assumed that the value of data stored in each block area 251 is "11." "0" is stored as the initial value of each bit 231 of the bitmap information 230.

If the access with respect to which the server 100 has determined in S26 that it cannot access the storage apparatus 300 is a write command, corresponding data stored in the storage apparatus 300 may not have been updated. Also, the server 100 may have transmitted another write command to the storage apparatus 300 before the transmission process in S27 is performed. In this case, the storage apparatus 300 may not have updated corresponding data since it cannot perform the write command. For this reason, the server 100 again transmits, to the storage apparatus 200, write commands that the server 100 has transmitted until the storage apparatus 200 creates the bitmap information 230 after transmitting the access with respect to which the server 100 has determined that the server 100 cannot access the storage apparatus 300 (S31). As a result, the bitmap information 230 also stores the write command with respect to which the server 100 has received no response from the storage apparatus 300 while considering a corresponding block area as a block area whose data has been updated. The storage system according to this embodiment is allowed to reestablish a mirroring relation between the storage apparatuses 200 and 300 without causing a data inconsistency. The server 100 has, for example, a function of storing information indicating the order of the times when it has transmitted an access command to the each storage apparatus. Use of this function allows the server 100 to detect write commands that the server 100 has transmitted until the storage apparatus 200 creates the bitmap information 230 after transmitting the access with respect to which the server 100 has determined that the server 100 cannot access the storage apparatus 300. If the access with respect to which the server 100 has made a determination in S26 is a read command, data stored in the volume 250 of the storage apparatus 200 is not updated. Therefore, there is no need to perform a special process.

Figure 7:
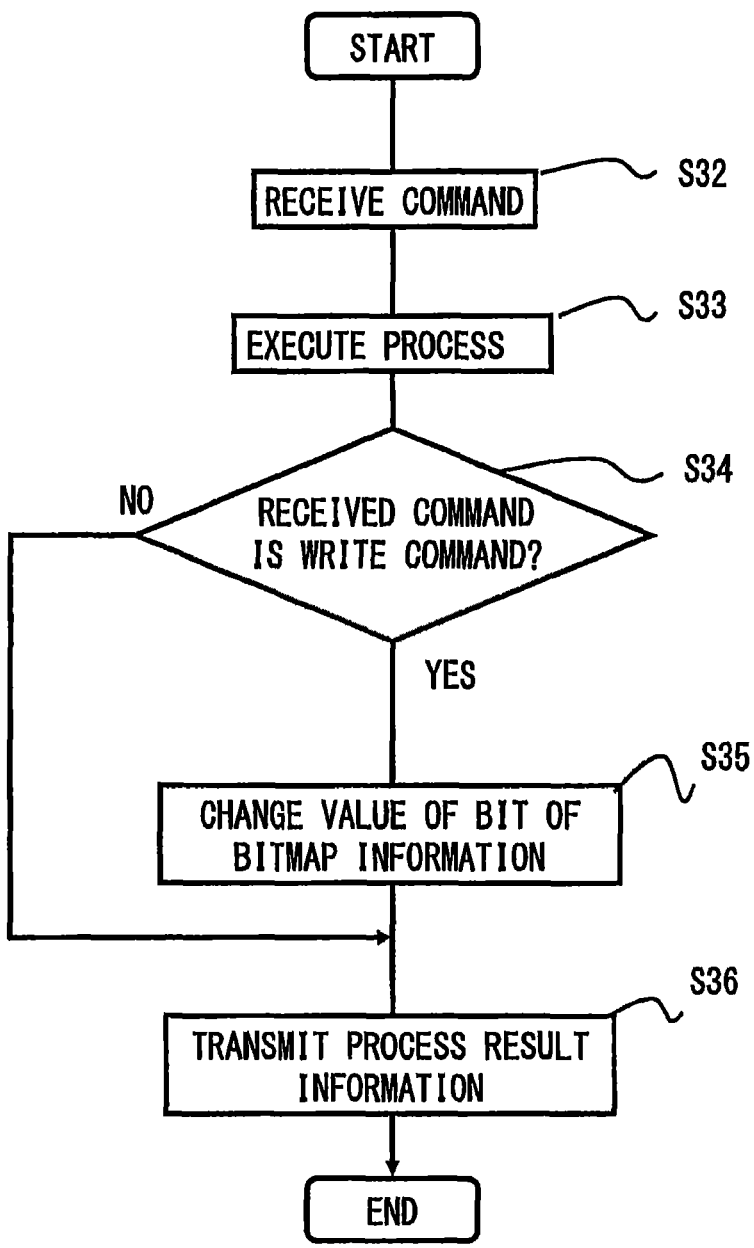
FIG. 7 is a flowchart of a process performed after a storage apparatus 200 and a storage apparatus 300 are separated from a mirroring relation.

Hereafter, a process performed by the storage apparatus 200 after the storage apparatuses 200 and 300 are separated from a mirroring relation will be described. FIG. 7 is a flowchart illustrating a process performed after the storage apparatuses 200 and 300 are separated from a mirroring relation.

The storage apparatus 200 receives a data write command or a data read command from the server 100 (S32). The storage apparatus 200 performs a process corresponding to the write command or read command (S33). The storage apparatus 200 determines whether the received command is a write command (S34). If the received command is a write command (YES in S34), the storage apparatus 200 changes the value of a bit 231 of the bitmap information 230 corresponding to a block area 251 that is the target of the write command received from the server 100, to a value indicating that a copy process has not been completed (S35). Specifically, the storage apparatus 200 updates the value of a bit 231 corresponding to a block area 251 that is the target of the write command, to "1." If the received command is a read command (NO in S34) or the storage apparatus 200 performs a process explained in S35, then the storage apparatus 200 transmits information indicating a result of the process, to the server 100 (S36). Upon receipt of the process result, the server 100 completes the write process.

By performing the above-mentioned processes, the server 100 is allowed to read or write data from or into the storage apparatus 200 even when the storage apparatus 300 is separated from a mirroring relation.

Figure 8:
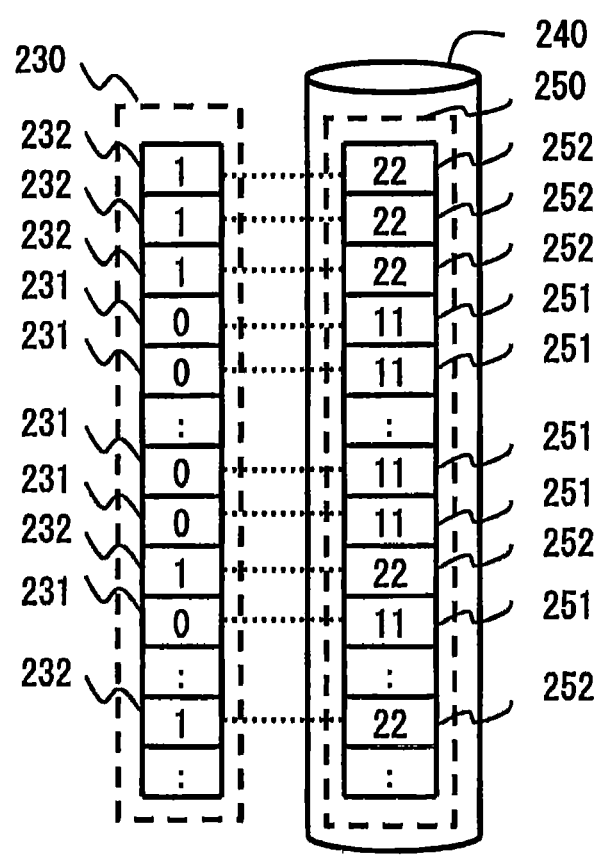
FIG. 8 is a diagram illustrating the relation among the bitmap information 230 and volume 250 at a time after the storage apparatuses 200 and 300 are separated from the mirroring relation.

FIG. 8 is a diagram illustrating the relation among the bitmap information 230, volume 250, and volume 350 at a time after the storage apparatuses 200 and 300 are separated from a mirroring relation. After the storage apparatuses 200 and 300 are separated from a mirroring relation, the server 100 transmits a write command to the storage apparatus 200 so that corresponding data stored in the storage apparatus 200 is updated. Reference numerals 252 illustrated in FIG. 8 represent block areas whose data has been updated. Here, it is assumed that a write command issued by the server 100 according to this embodiment updates the value of data from "11" to "22." Also, reference numerals 232 illustrated in FIG. 8 represent bits having a value of "1" among the bits 231. The bits 232 correspond to the block areas 252. Since pieces of data stored in the storage apparatus 300 are the same as those at the time when the storage apparatus 300 has been separated from the mirroring relation, the values of the pieces of data each remain "11."

Reestablishment of Mirroring Relation between Storage Apparatuses

Figure 9:
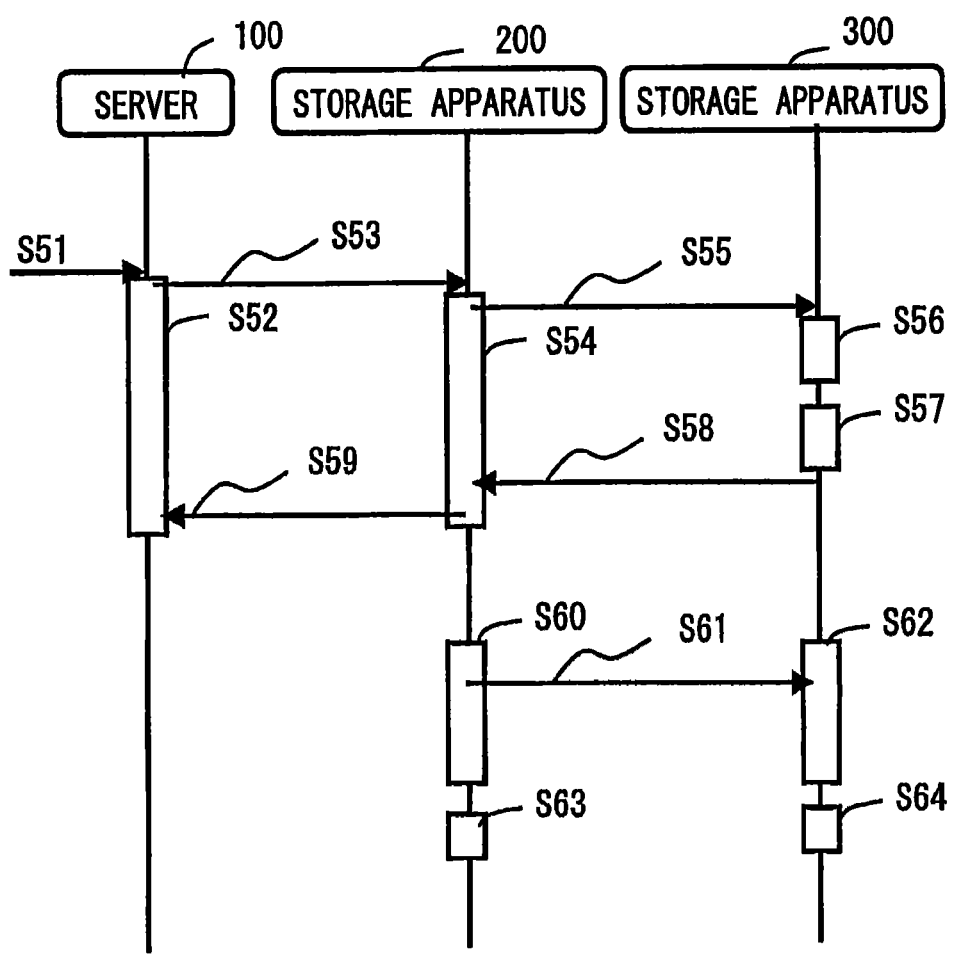
FIG. 9 is a diagram illustrating a sequence of operations performed when a mirror process is performed.

Next, processes performed when a mirroring relation is reestablished between the volume 250 of the storage apparatus 200 and the volume 350 of the storage apparatus 300 will be described. FIG. 9 is a diagram illustrating a sequence of operations performed when a mirror process is performed. A mirror process is divided into two stages. The first stage is a stage of performing a logical copy and the second stage is a stage of performing a physical copy. A logical copy performed in a mirror process is a process for copying bitmap information between the storage apparatuses. A physical copy performed in a mirror process is a process for copying data stored in a copy-source volume to a copy-destination volume.

First, operations performed when performing a logical copy will be described. A logical copy is realized by performing operations S51 to S59. If the server 100 is placed in a state in which it can properly access the storage apparatus 300, a mirroring relation is reestablished between the volume 250 of the storage apparatus 200 and the volume 350 of the storage apparatus 300 in the storage system. Whether the server 100 can properly access the storage apparatus 300 is determined, for example, by the administrator. The server 100 acquires instruction information for reestablishing a mirroring relation between the volume 250 and volume 350, for example, through input of information by the administrator (S51).

The server 100 starts a mirror process (S52). The server 100 transmits a command for starting a mirror process between the volume 250 and volume 350, to the storage apparatus 200 (S53). Upon receipt of the command from the server 100, the storage apparatus 200 starts a mirror process (S54).

The storage apparatus 200 transmits information for starting a mirror process, to the storage apparatus 300 (S55). The information includes information for identifying volumes that are subjects of mirroring, and the bitmap information 230. The storage apparatuses 200 and 300 sometimes include multiple volumes. Therefore, in order to identify volumes that will be subjected to a mirror process, the storage apparatus 200 transmits information for identifying volumes that will be subjected to a mirror process to the storage apparatus 300.

Upon receipt of the information for starting a mirror process, the storage apparatus 300 starts a mirror process (S56). The storage apparatus 300 retains the bitmap information 230 received from the storage apparatus 200 in the memory 320 as bitmap information 330 (S57).

The storage apparatus 200 has the bitmap information 230 and the storage apparatus 300 has the bitmap information 330. When the storage apparatus 200 receives information indicating that the bitmap information 230 has been copied to the storage apparatus 300 as the bitmap information 330 (S58), it notifies the server 100 that a logical copy has been completed (S59). Upon receipt of information indicating that the logical copy has been completed from the storage apparatus 200 in S59, the server 100 transmits a data write command or a data read command to the storage apparatus 200 and storage apparatus 300.

Figure 10:
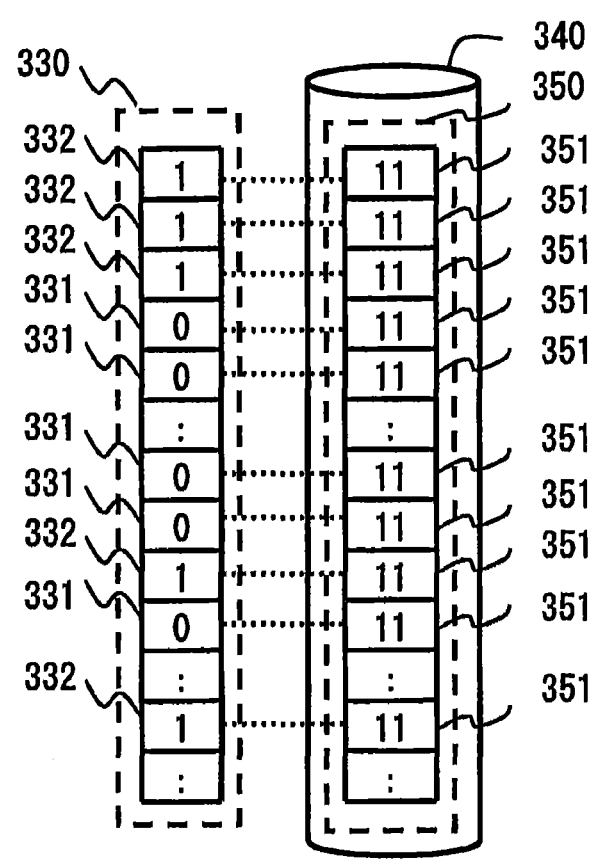
FIG. 10 is a diagram illustrating the relation between the bitmap information and volume at the time when a logical copy has been completed.

FIG. 10 is a diagram illustrating the relation between the bitmap information 330 and volume 350 at the time when the logical copy has been completed. Since the bitmap information 330 is a copy of the bitmap information 230, each updated location (bit value is "1") of the bitmap information 330 indicates that data has been updated in a corresponding location of the bitmap information 230 included in the storage apparatus 200. Therefore, use of the bitmap information 330 allows the storage apparatus 300 to determine whether an area is subjected to a physical copy when the storage apparatus 300 is accessed. Reference numerals 332 indicate bits having a value of "1" among bits 331. The value of each bit 231 of the bitmap information 230 is identical to the value of each bit 331 of the bitmap information 330.

A physical copy process in a mirror process performed between the storage apparatus 200 and storage apparatus 300 will be described. A physical copy process in a mirror process is performed for each of block areas 251 corresponding to the bits 231 of the bitmap information 230 and for each of the block areas 351 corresponding to the bits 331 of the bitmap information 330. The storage apparatus 200 starts performing a physical copy (S60). The storage apparatus 300 also starts performing a physical copy (S62). The storage apparatus 200 physically copies pieces of data stored in the block areas 252 of the volume 250 to corresponding block areas 351 of the volume 350 (S61). Block areas to be subjected to physical copies are block areas corresponding to bits having a value of "1" of the bitmap information. The server 100 has already received information indicating the completion of the logical copy from the storage apparatus 200. For this reason, the server 100 is allowed to transmit a data write command or a data read command to the storage apparatuses 200 and 300 even when a physical copy is being performed between the storage apparatuses 200 and 300. Since the server 100 makes an access to a data storage area of the storage apparatus 200 or 300 regardless of whether the area has been subjected to a physical copy, a process with respect to the access varies depending on the progress of the physical copy.

Hereafter, a process performed when the storage apparatus 200 is accessed by the server 100 during a mirror process will be described.

Figure 11:
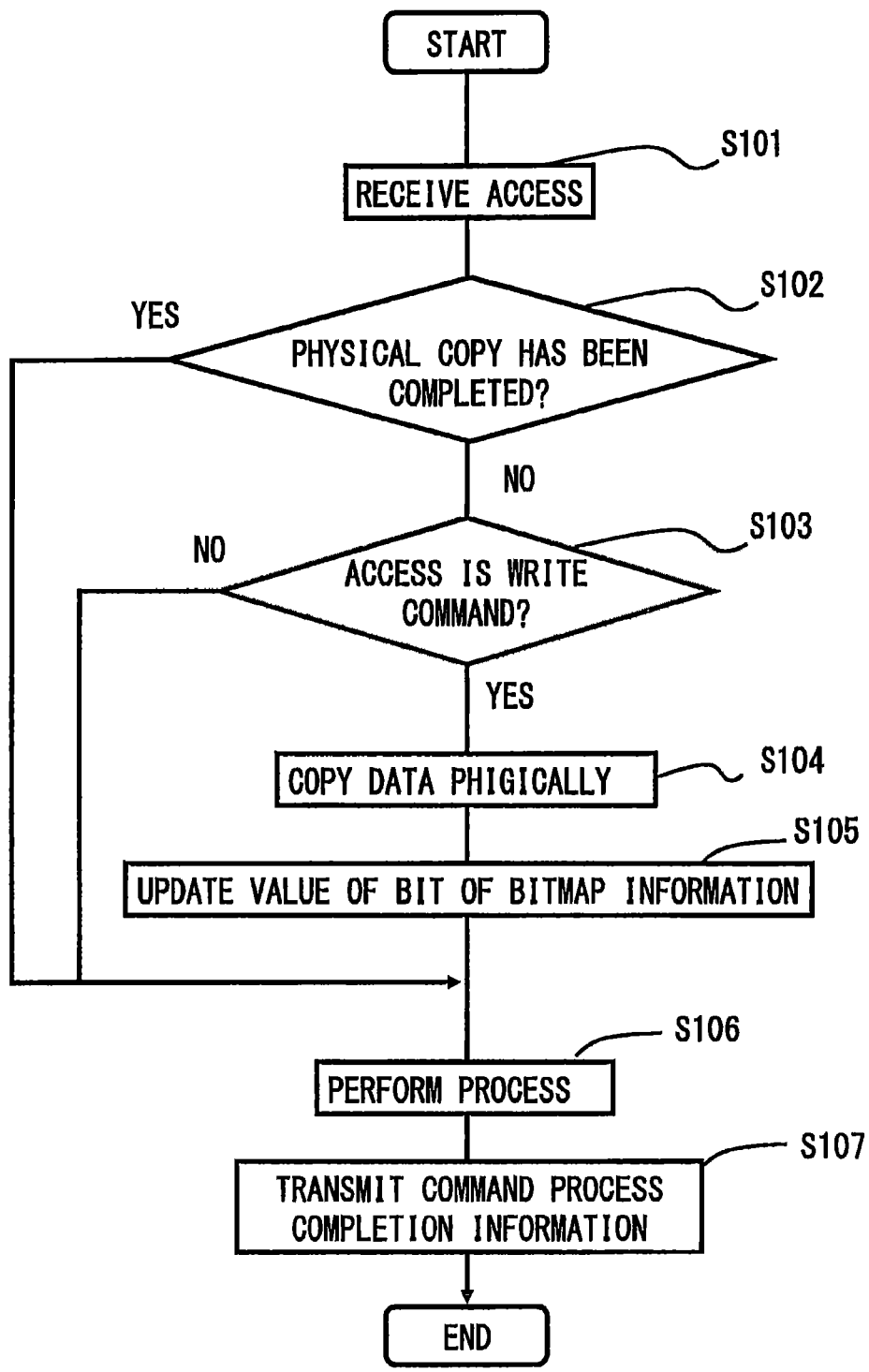
FIG. 11 is a flowchart of a process performed when the storage apparatus 200 is accessed by a server 100.

FIG. 11 is a flowchart of a process performed when the storage apparatus 200 is accessed by the server 100. The storage apparatus 200 receives an access from the server 100 (S101). The storage apparatus 200 determines whether a physical copy has been completed with respect to a block area that is the target of the access (S102). Specifically, the storage apparatus 200 determines whether the value of a bit 231 of the bitmap information 230 corresponding to the block area that is the subject of the access is "1" or "0."

If a physical copy has been completed with respect to the block area that is the target of the access (YES in S102), the storage apparatus 200 performs a process corresponding to the access (S106). As for block areas between which a physical copy has been completed, there is no need to update data by performing another physical copy after the access because the volume 250 and volume 350 have a mirroring relation. Since the server 100 performs mirroring on the block areas between which a physical copy has been completed, the storage apparatus 200 or 300 does not need to perform mirroring between the block areas. Therefore, the storage apparatus 200 can perform a process corresponding to the access.

On the other hand, if a physical copy has not been performed with respect to the block area that is the target of the access (NO in S102), the storage apparatus 200 determines whether the access received from the server 100 is a write command (S103). If the access is not a write command, that is, if the access is a read command (NO in S103), the storage apparatus 200 performs a process corresponding to the access (S106). Since the volume 250 of the storage apparatus 200 is a copy-source volume, there is no need to update data by performing a physical copy on the volume 250. Therefore, the storage apparatus 200 can perform a process corresponding to the access.

On the other hand, if the access is a write command (YES in S103), the storage apparatus 200 copies data stored in the block area 252 of the volume 250 that is the target of the access, to a corresponding block area 351 of the volume 350 (S104). The storage apparatus 200 updates the value of a bit 231 of the bitmap information 230 corresponding to the block area 252 that is the copy source, to "0" (S105). The storage apparatus 300 updates the value of a bit 331 of the bitmap information 330 corresponding to the block area 351 that is the copy destination, to "0." Therefore, the server 100 stops issuing a write command to the storage apparatus 300 during a period from the time when the storage apparatus 200 receives the write command to the time when the storage apparatus 300 updates the bitmap information 330. Subsequently, the storage apparatus 200 performs a process corresponding to the access (5106). Upon completion of the process, the storage apparatus 200 transmits information indicating the completion of the process of the command to the server 100 (S107). Subsequently, the storage apparatus 200 starts a physical copy process again.

If the storage apparatus 200 receives a write command to a block area 252 with respect to which a physical copy has not been completed, it performs a physical copy and then performs a process corresponding to the write command. Here, if the storage apparatus 200 determines that the storage apparatus 300 has not completed the write command issued by the server, it performs a physical copy on the storage apparatus 300. This is because if the storage apparatus 200 performs a physical copy on the storage apparatus 300 after the storage apparatus 300 has performed the write command issued by the server 100, a data inconsistency occurs. That is, after the storage apparatuses 200 and 300 have performed a mirror process between the respective block areas that are the targets of the write commands issued by the server 100, the storage apparatuses perform the write commands.

If the storage apparatus 200 receives a write command to a block area with respect to which a physical copy has not been completed, it may only update the value of a corresponding bit of the bitmap information to "0" without performing a physical copy. For example, the storage apparatus 200 transmits information for updating the value of a corresponding bit of the bitmap information 330 of the storage apparatus 300 to "0", to the storage apparatus 300. This is because the server 100 determines that the storage apparatus 200 and storage apparatus 300 have a mirroring relation and transmits a write command to each of the storage apparatuses 200 and 300. By adopting this configuration, the server 100 performs mirroring so that pieces of data that are stored in the storage apparatuses 200 and 300 and are the targets of the accesses are mirrored. This is advantageous in that the need to perform a mirroring process between the storage apparatuses is eliminated.

Figure 12:
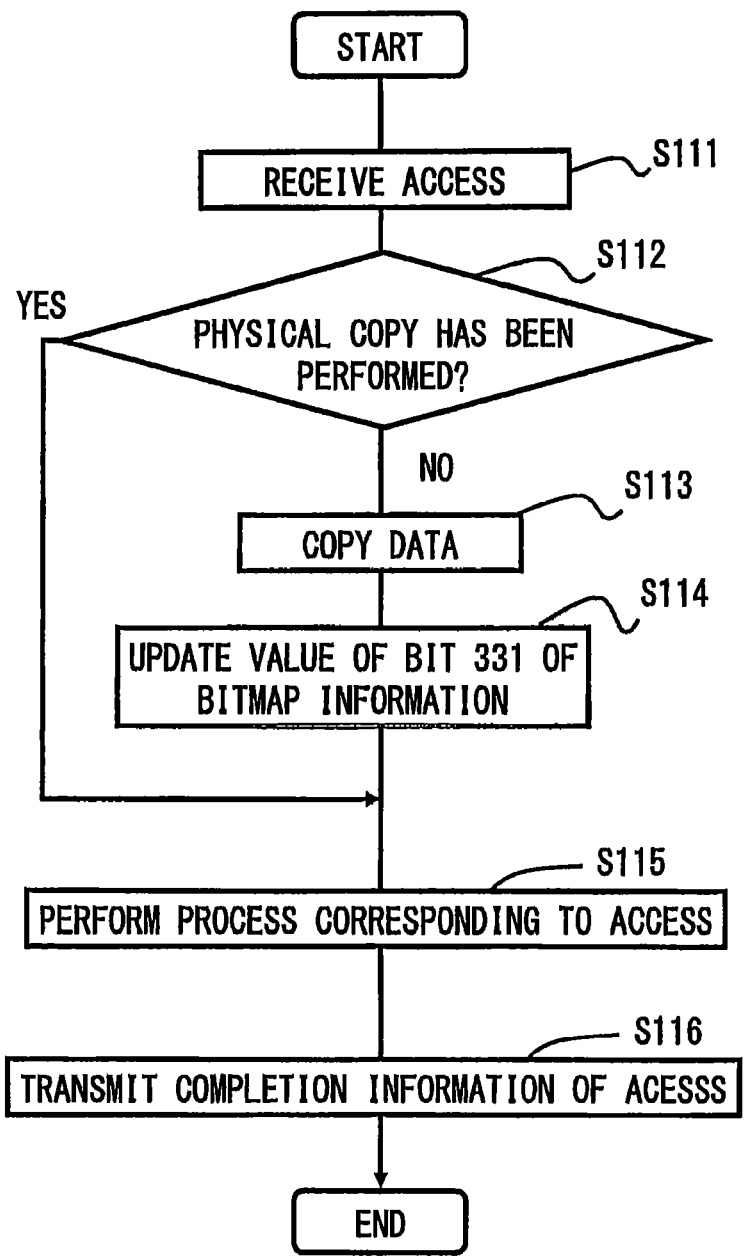
FIG. 12 is a flowchart of a process performed when the storage apparatus 300 is accessed by the server 100.

FIG. 12 is a flowchart of a process performed when the storage apparatus 300 receives an access from the server 100. The storage apparatus 300 receives an access from the server 100 (S111). The storage apparatus 300 determines whether a physical copy has been performed on a block area that is the target of the access (S112). Specifically, the storage apparatus 300 determines whether the value of a bit 331 of the bitmap information 330 corresponding to the block area that is the target of the access is "1" or "0."

If a physical copy has been performed on the block area that is the target of the access (YES in S112), the storage apparatus 300 performs a process corresponding to the access (S116). Since the block area on which a physical copy has been performed has a mirroring relation, there is no need to update data by performing a physical copy after the access. Therefore, the storage apparatus 300 can perform a process corresponding to the access.

If a physical copy has not been performed on the block area that is the target of the access (NO in S112), the storage apparatus 300 copies data stored in a block area 252 of the volume 250 corresponding to the accessed block area, to the block area 351 of the volume 350 (S113). Specifically, the storage apparatus 300 makes a request for transmitting data stored in a block area 252 of the volume 250 corresponding to the accessed block area, to the storage apparatus 200. The storage apparatus 200 performs a physical copy corresponding to the received transmission request on a priority basis.

The storage apparatus 300 updates the value of a bit 331 of the bitmap information 330 corresponding to the block area 351 that is the copy destination, to "0" (S114). On the other hand, the storage apparatus 200 updates the value of a bit 232 of the bitmap information 230 corresponding to the block area 252 that is the copy source, to "0." Subsequently, the storage apparatus 300 performs a process corresponding to the access (S115). Upon completion of the process, the storage apparatus 300 transmits information indicating the completion to the server 100 (S116). Subsequently, the storage apparatus 200 starts a physical copy again.

The storage apparatus 300 is different from the storage apparatus 200 in that it does not determine whether a command is a read command or a write command. This is because data stored in the volume 250 of the storage apparatus 200 is not changed due to a mirror process.

If the storage apparatus 300 receives a write command to a block area on which a physical copy has been performed, it may only update the value of a corresponding bit of the bitmap information to "0" without performing a physical copy. In this case, the storage apparatus 300 determines whether the command is a read command or a write command. By adopting this configuration, the server 100 performs mirroring so that pieces of data that are stored in the storage apparatuses 200 and 300 and are the targets of the accesses are mirrored. This is advantageous in that the process is simplified.

Incidentally, pieces of data stored in the volume 350 of the storage apparatus 300 can be changed due to a mirror process.

Figure 13:
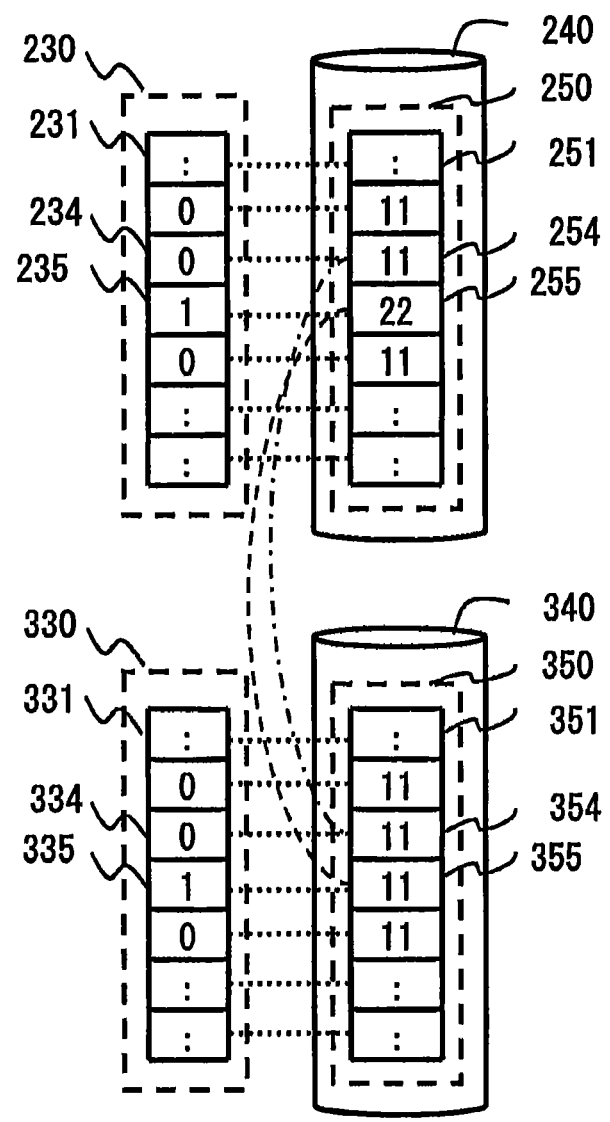
FIG. 13 is a diagram illustrating each volume and corresponding bitmap information during which a physical copy is being performed between the storage apparatuses 200 and 300.
Figure 14:
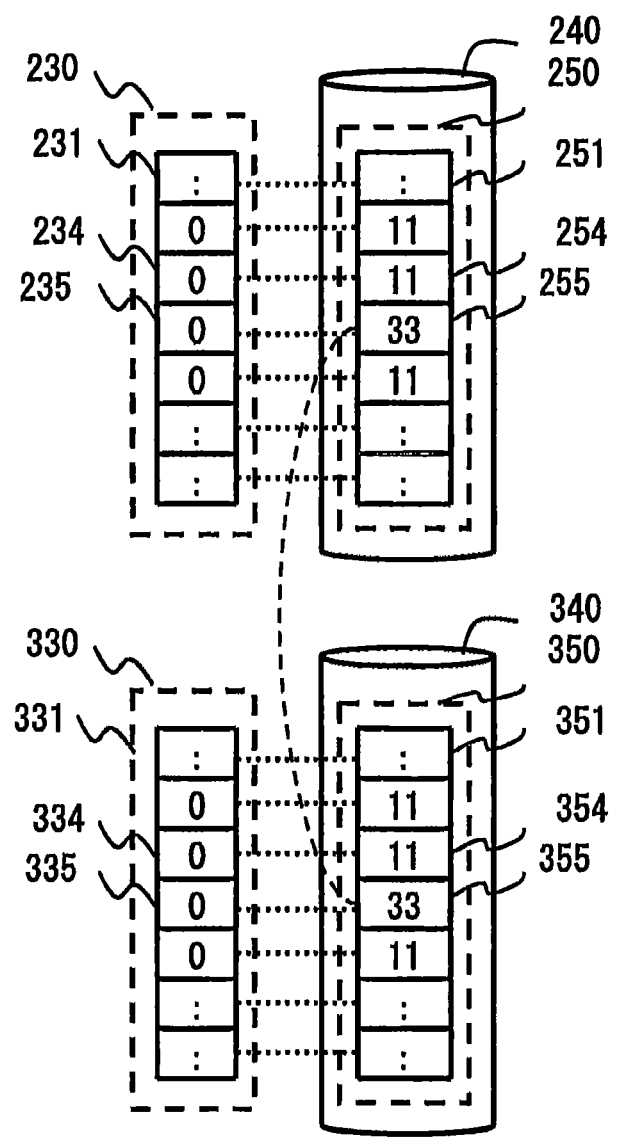
FIG. 14 is a diagram illustrating each volume and corresponding bitmap information at the time when the server 100 has write-accessed a block area 255 of the storage apparatus 200.

Specific examples will be described with reference to FIGS. 13 and 14. FIG. 13 is a diagram illustrating each volume and corresponding bitmap information at the time when a physical copy is being performed between the storage apparatuses 200 and 300.

Hereafter, a case where the server 100 accesses a block area 254 and a block area 354 will be described. A block area 254 is a block area that is one of the block areas 251 and is the target of the access from the server 100. A bit 234 is one of the bits 231 and corresponds to the block area 254. A block area 354 is a block area of the volume 350 corresponding to the block area 254. A bit 334 is one of the bits 331 and corresponds to the block area 354. Data stored in the block area 254 is identical to data store in the block area 354. The value of the bit 234 corresponding to the block area 254 and the value of the bit 334 corresponding to the block area 354 are both "0."

If the server 100 read-accesses the block area 254 of the volume 250, the storage apparatus 200 transmits data stored in the block area 254 to the server 100. If the server 100 write-accesses the block area 254 of the volume 250, the storage apparatus 200 updates the data stored in the block area 254 in response to the write access. If the server 100 read-accesses the block area 354 of the volume 350, the storage apparatus 300 transmits data stored in the block area 354 to the server 100. If the server 100 write-accesses the block area 354 of the volume 350, the storage apparatus 300 updates the data stored in the block area 354 in response to the write access.

Next, a case where the server 100 accesses a block area 255 and a block area 355 will be described. The block area 255 is a block area that is one of the block areas 251 and is the target of the access from the server 100. A bit 235 is one of the bits 231 and corresponds to the block area 255. The block area 355 is a block area of the volume 350 and corresponds to the block area 255. A bit 335 is one of the bits 331 and corresponds to the block area 355. Data stored in the block area 255 is "22" and data stored in the block area 355 is "11." That is, the data stored in the block area 255 and the data stored in the block area 355 are different from each other. The value of the bit 235 corresponding to the block area 255 and the value of the bit 335 corresponding to the block area 355 are both "1."

If the server 100 read-accesses the block area 255 of the volume 250, the storage apparatus 200 transmits the data stored in the block area 255 to the server 100.

If the server 100 write-accesses the block area 255 of the volume 250, the storage apparatus 200 copies the data stored in the block area 255 to the block area 355. Subsequently, the storage apparatus 200 sets the value of the bit 235 to "0." Subsequently, the storage apparatus 200 updates the data stored in the block area 255 in response to the write access. Also, the storage apparatus 300 sets the value of the block area 355 to "0." FIG. 14 illustrates each volume and corresponding bitmap information at the time when the server 100 has read-accessed the block area 255 of the storage apparatus 200. In FIG. 14, it is assumed that the data stored in the block area 255 has been updated to "33." Also, the block area 355 of the storage apparatus 300 has been updated to "33" due to a write-access to the storage apparatus 300 made by the server 100. The storage apparatuses 200 and 300 perform processes corresponding to the accesses after the physical copy has been completed, if block areas undergoing a physical copy receive accesses from the server 100.

If the server 100 write-accesses the block area 255 of the volume 250, a physical copy does not always need to be performed between the storage apparatuses 200 and 300. Specifically, the storage apparatuses 200 and 300 update the values of corresponding bits of the bitmap information 230 and bitmap information 330 to "0." By adopting this configuration, the server 100 performs mirroring so that data that is stored in the storage apparatus 200 and is the target of the access and corresponding data stored in the storage apparatus 300 are mirrored. This is advantageous in that the process is simplified.

If the server 100 read-accesses the block area 355 of the volume 350, the storage apparatus 300 physically copies the data stored in the block area 255 of the volume 250 to the block area 355. Subsequently, the storage apparatus 300 transmits data stored in the block area 355 to the server 100.

Also, if the server 100 write-accesses the block area 355 of the volume 350, the storage apparatus 300 physically copies the data stored in the block area 255 of the volume 250 to the block area 355. Subsequently, the storage apparatus 300 updates the data stored in the block area 355 in response to the write access. Alternatively, the storage apparatus 200 may update the value of the bit 235 to "0" and the storage apparatus 300 may update the value of the bit 335 to "0." The block area 255 of the storage apparatus 200 is updated to "33" due to a write access to the storage apparatus 200 made by the server 100. FIG. 14 illustrates each volume and corresponding bitmap information at the time when the write access to the block area 355 made by the server 100 has been completed. In FIG. 14, it is assumed that the data stored in the block area 355 has been updated to "33."

FIG. 9 will be described again. When all block areas of the volume 250 have been physically copied, the storage apparatus 200 opens the bitmap information 230 stored in the memory 220 (S63). The time when it is determined that all block areas of the volume 250 have been physically copied is the time when the values of all the bits 231 of the volume 250 have become "0." Likewise, when all block areas of the volume 350 have undergone physical copies, the storage apparatus 300 opens the bitmap information 330 stored in the memory 320 (S64). The time when it is determined that all block areas of the volume 350 have undergone physical copies is the time when the values of all the bits 331 of the volume 350 have become "0."

If a mirroring relation is first established between the volume 250 and volume 350, for example, it is preferable that in S54 of FIG. 9, the storage apparatus 200 create bitmap information 230 where the values of all the bits 231 are "1" and then the processes in S55 and later be performed.

Figure 15:
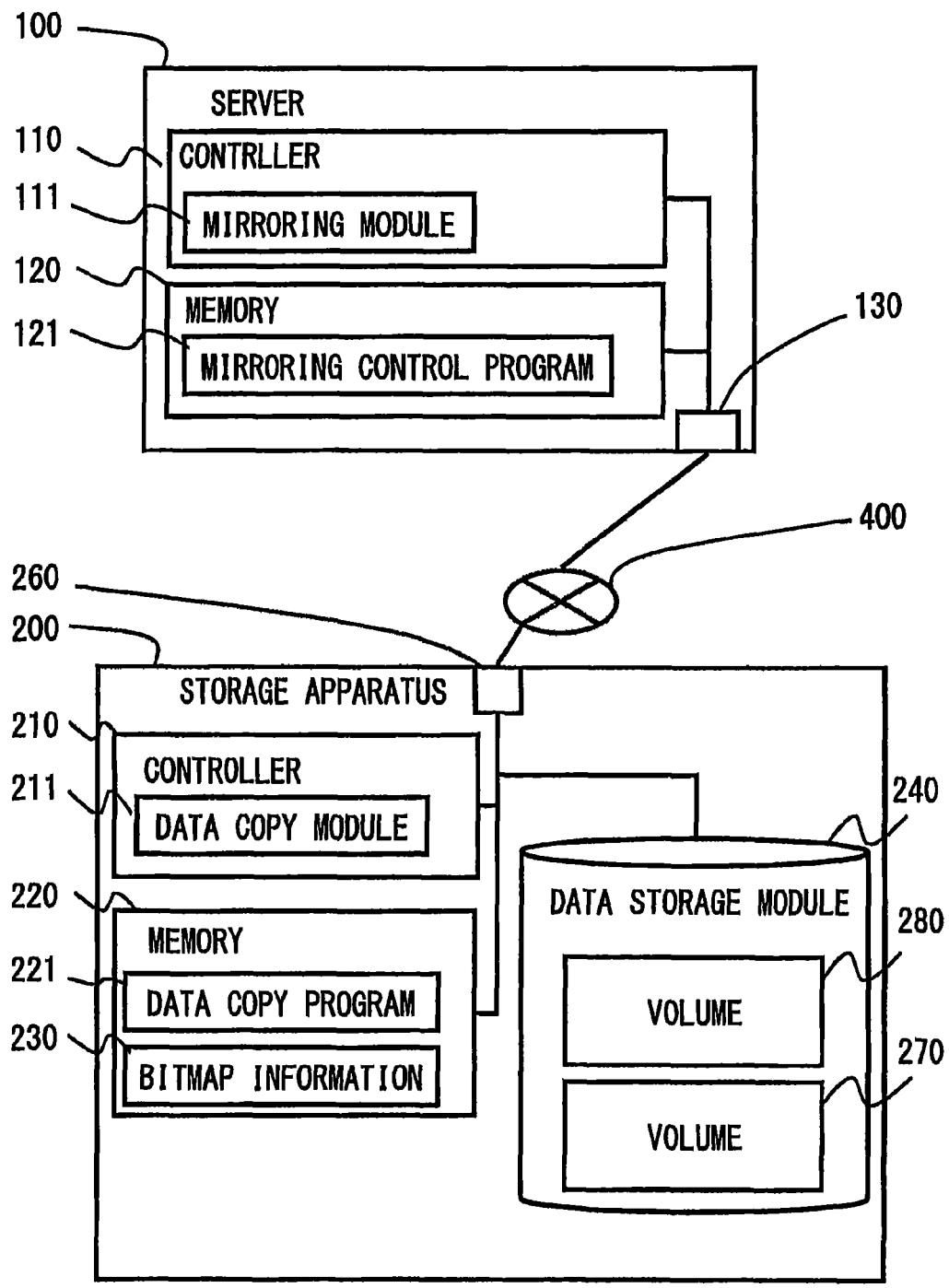
FIG. 15 is a diagram illustrating a storage system in which a data storage module 240 of the storage apparatus 200 has multiple data storage areas.

A configuration where multiple storage apparatuses are included and each storage apparatus controls a data storage area has heretofore been described. Also, there is a case where one storage apparatus controls multiple data storage areas. FIG. 15 is a storage system in which the data storage module 240 of the storage apparatus 200 has multiple data storage areas (volumes).

This embodiment is also applicable to mirroring performed between multiple volumes of one storage apparatus. If mirroring is performed between a volume 280 and a volume 270 of the storage apparatus 200, no load is imposed on the network 400 when a physical copy process is performed between the volumes.

The storage apparatus 200 performs the following processes. Upon receipt of an instruction for separating the volume 270, the storage apparatus 200 creates bitmap information 230. The storage apparatus 200 records areas where data has been updated since the separation of the volume 270, of the volume 280 by changing the bits 231 of the bitmap information 230. If the volume 270 is returned to a mirroring relation, the storage apparatus 200 transmits information indicating that a logical copy has been completed, to the server 100. Subsequently, the storage apparatus 200 physically copies pieces of data stored in block areas of the volume 280 corresponding to the bits 231 of the bitmap information 230, to the volume 270.

In mirroring control methods to which this embodiment has yet to be applied, a server has information for establishing a mirroring relation. There is also a method by which a server records data indicating a difference made between the time when a storage apparatus is separated from a mirroring relation and the time when the storage apparatus is returned to a mirroring relation and the difference data is updated when a mirroring relation is reestablished. However, there are a problem that it takes a longer time to establish a mirroring relation as the amount of the difference data is increased and a problem that when the difference data is being copied, a load for performing the copy process is imposed on the route of a fibre channel or on the server.

In this embodiment, the storage apparatuses perform a physical copy process using a new advanced copy function and the server 100 is not involved in performance of a physical copy. This allows the server 100 to access the storage apparatuses that are performing a physical copy process.

Advanced Copy Function

Hereafter, an advanced copy function of the storage apparatuses 200 and 300 will be described. The advanced copy function is a function that allows the storage apparatus 200 to copy data between the storage apparatuses 200 and 300 without using the server 100. Specifically, the controller 210 of the storage apparatus 200 copies pieces of data stored in the block areas 251 of the volume 250 of the storage apparatus 200 at a point in time, to the block areas 351 of the volume 350 of the storage apparatus 300. The advanced copy function includes the equivalent copy function (hereafter referred to as "EC"), the one point copy function (hereafter referred to as "OPC"), and the like. OPC includes the quick one point copy function (hereafter referred to as "quick OPC") by which the second and later copies between the block areas 251 and block areas 351 are performed only with respect to pieces of data that have been updated since the previous OPC process.

OPC will be described below. The storage apparatuses 200 and 300 perform two copy processes, that is, a logical copy and a physical copy, using OPC. A logical copy is a process for creating bitmap information indicating the progress of a copy process. If the storage apparatus 200 completes a logical copy, it transmits information indicating the completion to the server 100. Typically, a logical copy is completed in several seconds or so. A physical copy is an actual copy process performed between the storage apparatuses 200 and 300 after the completion of the logical copy. In a physical copy process, the storage apparatuses 200 and 300 each associate the bits of the corresponding bitmap information with the corresponding block areas and then copy pieces of data stored in the block areas 251 of the volume 250 of the storage apparatus 200, to the block areas 351 of the volume 350 of the storage apparatus 300.

After the completion of the logical copy, the server 100 receives notification to that effect from the storage apparatus 200. Since the physical copy is performed between the storage apparatuses 200 and 300, the server 100 is allowed to access the storage apparatuses 200 and 300 even when the storage apparatuses are performing the physical copy process. In this case, if the storage apparatuses 200 and 300 are accessed by the server 100 during performance of the physical copy, the storage apparatuses perform a process corresponding to the progress of the physical copy. Specifically, the storage apparatuses perform the following different processes in accordance with the progress of the physical copy. That is, (1) if a block area that is a copy source and has yet to undergo an OPC process receives a data write access, the storage apparatus performs an OPC process on the block area and then writes data into the block area in response to the write access; (2) if a block area that is a copy source and has yet to undergo an OPC process receives a data read access, the storage apparatus directly reads data from the block area; (3) if a block area that has yet to undergo an OPC process and is a copy destination receives a data write access, the storage apparatus performs an OPC process on the block area and then writes data into the block area in response to the write access; (4) if a block area that is the copy destination and has yet to undergo an OPC process receives a data read access, the storage apparatus performs an OPC process on the block area and then reads data from the block area in response to the read access; and (5) the storage apparatus directly reads data from a block area that has yet to undergo an OPC process.

Using OPC, the server 100 determines that a copy process has been completed between the storage apparatus 200 and storage apparatus 300. This allows the server 100 to continuously access the storage apparatuses 200 and 300.

Next, quick OPC will be described. First, the storage apparatus 200 copies (initial copy) pieces of data stored in the volume 250 to the volume 350 of the storage apparatus 300 using quick OPC. Subsequently, the storage apparatus 200 copies (difference copy) only updated pieces of data stored in the volume 250 to the volume 350. The storage apparatuses perform a process for performing a copy between the volumes using OPC, as well as perform a difference information acquisition process for acquiring the states of updated pieces of data using quick OPC. The storage apparatuses are allowed to physically copy only different pieces of data between the volumes by performing the copy process and difference information acquisition process.

If the storage apparatuses first start a quick OPC process, they create bitmap information for transmission indicating the copy state and bitmap information for update indicating the update state. Thus, the storage apparatuses complete a logical copy process in an initial copy process. Subsequently, the storage apparatuses physically copy data stored in a copy-source volume to a copy-destination volume for each block area. The storage apparatuses change a bit of the bitmap information for transmission corresponding to a block area to be subjected to a physical copy, the bit indicating "completion of copy." Even if physical copies between the block areas of the volumes have been completed, the storage apparatuses continue to perform a quick OPC process.

If the storage apparatuses receive write accesses to the copy-source area and copy-destination area from the server 100, the storage apparatuses record updated locations in the bitmap information for update. If the storage apparatuses receive, from the server 100, a write access to a block area 251 of the copy-source volume yet to be physically copied, the storage apparatuses copy data stored in the block area 251 to a corresponding block area 351. Subsequently, the storage apparatuses perform a process corresponding to the write access. The storage apparatuses change a bit of the bitmap information for transmission corresponding to the access, to "copy completed" and change a bit of the bitmap information for update corresponding to the access, to "update included." Upon receipt of an instruction for performing quick OPC from the server 100, the storage apparatuses copy data stored in the copy-source block area 251 corresponding to the bit of the bitmap information for update indicating that the bit has been updated, to the copy-destination block area 351. The storage apparatuses perform a logical copy and a physical copy even when performing a difference copy. After the storage apparatuses complete the logical copy process, the server 100 is allowed to access the copy-source area or copy-destination area.

Next, EC will be described. Using EC, data stored in a block area of the copy-source volume is copied to a block area of the copy-destination volume so that data is redundant in the copy source and copy destination. By breaking the redundancy between the volumes, the storage apparatuses acquire a copy of data at a point in time. "Suspend" means that the redundancy is suspended or broken. "Resume" means that the redundancy is restored. When the redundancy is restored, only pieces of data that have been updated in the copy-source volume since the break of the redundancy are reflected on the copy-destination volume.

If the storage apparatuses receive write-accesses from the server in a redundant state, the write accesses are performed on both the volumes. The storage apparatuses retain a data equivalent state between the copy-source volume and copy-destination volume. If the storage apparatuses receive an instruction for creating a copy from the server 100, the storage apparatuses break the equivalent state between the volumes (stop). Alternatively, the storage apparatuses suspend the equivalent state between the volumes (suspend). Thus, the server 100 can separately access the volumes whose equivalent state has been broken or suspended. When the redundancy is restored, the storage apparatuses perform the restoration of the redundancy before performing an access from the server 100. Therefore, the server 100 cannot access the volumes when a restoration process is being performed using EC.

The mirror process according to this embodiment is different from OPC, quick OPC and EC in that: (1) difference data is acquired after a mirroring relation is broken; (2) bitmap information is already complete at the time when a mirror process is performed; (3) notification indicating the completion of a logical copy is provided to the server 100 in the stage of performing a mirror process; and (4) the server 100 is allowed to perform a read-access and a write-access to the volumes in the stage of performing a mirror process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:
1. A storage system comprising:
a first storage apparatus including a first data storage module having multiple areas, each of the multiple areas storing data;
a second storage apparatus including a second data storage module having multiple areas, each of the multiple areas storing data; and
a server to transmit a write command to the first and second storage apparatuses to perform data mirroring between the first and second data storage modules, the server including a controller to execute a process including:
detecting that an abnormality occurs in the write command to the second storage apparatus,
transmitting a first instruction of recording start for storing difference data between the first and second data storage modules, to the first storage apparatus, upon detecting the occurrence of the abnormality,
receiving a completion-notice for the first instruction,
retransmitting the write command, which is transmitted to the second storage apparatus when the abnormality occurs and until receiving the completion-notice from the occurrence of the abnormality, to the first storage apparatus, and transmitting a second instruction to restart performing data mirroring between the first and second data storage modules to the first storage apparatus when a restart instruction is input by an administrator, the first storage apparatus including a first memory to store bitmap information with a bit corresponding to each of the multiple areas in the first data storage area, and a first controller to execute a process including:

receiving the first instruction from the server, creating the bitmap information with all bits having a first value, indicating that data stored in each of multiple areas in the first data storage module is identical to data stored in a corresponding area of the second multiple areas in the second storage module, transmitting the completion-notice to the server when creation of the bitmap-information is completed, receiving the write command from the server after transmitting the completion-notice to the server, storing data in the write command into an area, which is addressed by the write command, of the multi areas in the first data storage module, setting a second value indicating difference data between the first and second data storage modules to a bit in the bitmap information corresponding to the area addressed by the write command, receiving the second instruction from the server, and copying data stored in the area, which is corresponding to the bit having the second value in the bitmap information, of the multi areas of the first data storage module for data mirroring into a corresponding area of the second data storage module.

2. The system according to claim 1, wherein the first controller of the first storage apparatus executes a process further including:

receiving the write command from the server after receiving the second instruction from the server, and writing data in the write command into an area, which is addressed by the write command, of the multiple areas in the first data storage module after copying data stored in the area addressed by the write command into the second data storage module when a bit in the bitmap information corresponding to the area addressed by the write command has the second value.

3. The system according to claim 1, wherein the second storage apparatus includes a second controller and a second memory, the second controller to execute a process including:

receiving the bitmap from the first storage apparatus and storing the bitmap into the second memory, receiving the write command from the server, requesting data for copying to the first storage apparatus when a bit in the bitmap information corresponding to an area addressed by the write command has the second value, writing the data for copying into the area addressed by the write command when receiving the data for copying from the first storage apparatus, and writing data of the write command into the area addressed by the write command after writing the data for copying is completed.

* * * * *